United States Patent
Ewald et al.

(10) Patent No.: US 12,190,562 B2
(45) Date of Patent: Jan. 7, 2025

(54) fMRI TASK SETTINGS WITH MACHINE LEARNING

(71) Applicant: KONINKLIJKE PHILIPS N.V., Eindhoven (NL)

(72) Inventors: Arne Ewald, Hamburg (DE); Rudolf Mathias Johannes Nicolaas Lamerichs, Liempde (NL); Nick Flaschner, Hamburg (DE); Bernhard Gleich, Hamburg (DE); Peter Boernert, Hamburg (DE); Ingmar Graesslin, Boenningstedt (DE); Johannes Adrianus Overweg, Uelzen (DE)

(73) Assignee: Koninklijke Philips N.V., Eindhoven (NL)

( * ) Notice: Subject to any disclaimer, the term of this patent is extended or adjusted under 35 U.S.C. 154(b) by 371 days.

(21) Appl. No.: 17/621,718

(22) PCT Filed: Jun. 24, 2020

(86) PCT No.: PCT/EP2020/067679
§ 371 (c)(1),
(2) Date: Dec. 22, 2021

(87) PCT Pub. No.: WO2021/001238
PCT Pub. Date: Jan. 7, 2021

(65) Prior Publication Data
US 2022/0237787 A1      Jul. 28, 2022

(30) Foreign Application Priority Data
Jul. 1, 2019    (EP) .................................. 19183551

(51) Int. Cl.
*G06V 10/764*     (2022.01)
*G06N 3/08*       (2023.01)
(Continued)

(52) U.S. Cl.
CPC ............. *G06V 10/764* (2022.01); *G06N 3/08* (2013.01); *G06T 7/0012* (2013.01); *G06V 10/82* (2022.01);
(Continued)

(58) Field of Classification Search
CPC .. G06V 10/764; G06V 10/82; G06V 2201/03; G06N 3/08; G06N 3/045;
(Continued)

(56) References Cited

U.S. PATENT DOCUMENTS 11,896,390 B2 *   2/2024   Fang ................... A61B 5/0035
2002/0103429 A1 * 8/2002   deCharms .............. A61B 5/055
                                                      600/410
(Continued)

FOREIGN PATENT DOCUMENTS

WO    2018029679 A1    2/2018

OTHER PUBLICATIONS

Huang et al "Modeling Task FMRI Data via Deep Convolutional Autoencoder" IEEE Transactions on Medical Imaging vol. 37, No. Jul. 7, 2018 p. 1551-1561.
(Continued)

*Primary Examiner* — Dhaval V Patel

(57) ABSTRACT

The present disclosure relates to a medical imaging method, comprising: receiving (201) a set of subject parameters descriptive of a subject; in response to inputting (203) the set of subject parameters into a trained deep neural network, DNN, receiving (205) from the trained DNN a predicted task; presenting the task to the subject; controlling (207) an MRI system (700) for acquiring fMRI data from the subject in response to the predicted task performed by the subject during the acquisition.

19 Claims, 4 Drawing Sheets

(51) Int. Cl.
  *G06T 7/00* (2017.01)
  *G06V 10/82* (2022.01)
(52) U.S. Cl.
  CPC ............... *G06T 2207/10088* (2013.01); *G06T 2207/20081* (2013.01); *G06T 2207/20084* (2013.01)
(58) Field of Classification Search
  CPC .................. G06N 3/084; G06T 7/0012; G06T 2207/10088; G06T 2207/20081; G06T 2207/20084; G06F 18/214; G06F 18/2414
  See application file for complete search history.

(56) References Cited

U.S. PATENT DOCUMENTS

| | | | |
|---|---|---|---|
| 2005/0267357 A1* | 12/2005 | Rao | .................. A61B 5/168 |
| | | | 600/411 |
| 2007/0167724 A1* | 7/2007 | Gadagkar | .......... G01R 33/4806 |
| | | | 600/410 |
| 2008/0200799 A1* | 8/2008 | Willard | .............. G01R 33/5601 |
| | | | 600/420 |
| 2009/0209845 A1* | 8/2009 | Christen | .................. A61B 5/16 |
| | | | 600/545 |
| 2017/0123028 A1 | 5/2017 | Hammer et al. | |
| 2018/0060757 A1* | 3/2018 | Li | ........................... G06N 20/00 |
| 2021/0241908 A1* | 8/2021 | Ciupa | .................. A61B 5/7257 |

OTHER PUBLICATIONS

Huang et al "Modeling Task FMRI Data Via Mixture of Deep Expert Networks" 2018 IEEE 15th International Symposium on Biomedical Imaging Apr. 4-7, 2018.

International Search Report and Written Opinion from PCT/EP2020/067679 mailed Jan. 7, 2021.

* cited by examiner fMRI TASK SETTINGS WITH MACHINE LEARNING

CROSS REFERENCE TO RELATED APPLICATIONS

This application is a U.S. national phase application of International Application No. PCT/EP2020/067679 filed on Jun. 24, 2020, which claims the benefit of EP application Ser. No. 19/183,551.1 filed on Jul. 1, 2019 and is incorporated herein by reference.

FIELD OF THE INVENTION

The invention relates to scanning imaging systems, in particular to a medical analysis system for acquiring fMRI data using task settings obtained with machine learning.

BACKGROUND OF THE INVENTION

Magnetic resonance imaging (MRI) scanners rely on a large static magnetic field (B0) to align the nuclear spins of atoms as part of the procedure for producing images within the body of a patient. These images can reflect various quantities or properties of the subject. For example, the hemodynamic response of brain activation causes magnetic and electric changes in the activated brain area. MRI allows visualizing magnetic changes, e.g. based on the cerebral blood flow or blood-oxygen-level dependent (BOLD) effect. The latter is usually referred to as functional MRI (fMRI). A major problem in fMRI is choosing the optimal task or task parameters for an individual.

SUMMARY OF THE INVENTION

Various embodiments provide for a medical analysis system, method, and computer program product, as described by the subject matter of the independent claims. Advantageous embodiments are described in the dependent claims.

Disease classification, treatment selection, or disease progression prognosis can have a much higher specificity if a well-controlled task is used in a task-based experiment. Furthermore, the signal to noise ratio (SNR) in the task-based experiment is usually high when an averaging with respect to the stimulus can be applied. However, choosing the right task or task parameters for an individual remains difficult. The present subject matter may enable to select or fine-tune a subject specific fMRI task or task parameters in order to make feasible and enhance a more precise disease classification, treatment selection or disease progression prognosis, based on meta features of subject data. For example, a set of subject data such as age and body size which are descriptive of the subject may be input to a trained neural network in order to predict by the trained neural network the task to be performed by the subject. The predicted task may be performed by the subject while acquiring fMRI data.

In accordance with an aspect, the invention relates to a medical imaging system. The medical imaging system comprises: a magnetic resonance imaging, MRI, system configured for acquiring functional magnetic resonance imaging, fMRI, data from a subject within an imaging zone; a memory storing machine executable instructions; a processor configured for controlling the medical imaging system, wherein execution of the machine executable instructions causes the processor to: receive a set of predefined subject data descriptive of the subject; in response to inputting the set of subject data into a trained deep neural network, DNN, receive from the trained DNN a predicted task. The predicted task may be a task triggering brain activities. The MRI system may be controlled for acquiring fMRI data from the subject in response to the predicted task performed by the subject during the acquisition.

The subject data may for example be defined offline e.g. by using a system different from the medical imaging system and/or in a time period preceding (a day or month before) the acquisition of the fMRI data from the subject in response to the predicted task being performed by the subject during the acquisition. Defining the subject data offline may save processing time by speeding up the acquisition of the fMRI data. This may particularly be advantageous in case of a damaged brain tissue in stroke because it has a treatment window of a few hours only. For example, a subject database may be provided. At least part of the content of the subject database may be used for training the DNN. For the application stage of the trained DNN, only the data of the subject of interest may be necessary and may be obtained from the subject database. The subject database comprises metadata such as age, disease, gender, handedness, body size of different subjects including the subject of the present embodiment. The step of receiving the set of subject data may comprise reading from the subject database the set of subject data descriptive of the subject. The set of subject data may comprise values of a set of predefined subject parameters. Using the subject database to retrieve the subject data offline may be advantageous as it may save processing resources that would otherwise be required by a determination of the values of the set of subject parameters using multiple sources of data instead of a single database e.g. the time required to read data (e.g. as a single entry) from the database may be smaller than the time required to collect each of the values of the set of subject parameters from respective one or more sources.

The fMRI data may be acquired from a region of interest (the imaging zone) of the subject. The region of interest may, for example, be the brain of the subject.

The present subject matter may be advantageous as it may enable a fully automated fMRI data acquisition. The present subject matter may enable to automate the data acquisition reducing the need for operator intervention. This may particularly be advantageous as the number and complexity of subject data increase and threaten to overwhelm users' capacities to interpret them.

The present subject matter may simplify and shorten fMRI data acquisition as the task is accurately defined and thus an unnecessary repeated scanning with multiple task attempts may be prevented. This may, for example, be advantageous in case of a damaged brain tissue in stroke because it has a treatment window of a few hours only.

Using the DNN may be advantageous as it may enable to model linear as well as complex non-linear relationships. This may particularly be advantageous in case the amount of subject data is large.

For example, the predicted task may enable to identify a brain area in a neural system of the subject. Example tasks may include visual cues, tapping left fingers, squeezing left toes, moving tongue etc. In another example, the predicted task may be a cognitive task. For example, the predicted task may be an executive function. The cognitive task may for example seek problem solving, planning, organizational skills, selective attention, inhibitory control and some aspects of short term memory. Examples are n-back, Paced Auditory Serial Addition Test (PASAT), Boston Naming Test, and Test of Memory Malingering (TOMM).

According to one embodiment, the trained DNN is a recurrent neural network, RNN, the set of subject data comprising a set fMRI images of the subject in a resting state, wherein the inputting of the set of subject data comprises inputting the set of fMRI images to the trained DNN. The set of fMRI images may be acquired by the MRI system or another MRI system at a resting state of the subject.

This may enable to learn individual task settings based on a prior resting state setting. Each person might have a distinct fMRI resting state signature, i.e. fingerprint. This signature can possibly be related to an optimal task or optimal task parameter setting for this particular subject. This relationship could be learnt with a recurrent artificial neural network. A recommender system may for example be used to label the subject data e.g. "people who have this resting state signature usually respond well to these task parameters". For example, a subject having a rather weak BOLD response and thereby a bad SNR in auditory areas, a visual task may be chosen, if the overall study protocol allows for that. This embodiment may be advantageous as the resting state data may enable a reference point of settings for task-based fMRI data.

Using the RNN may be advantageous as it may be trained to recognize patterns across time. In particular patterns in fMRI time series may enable to capture BOLD signal correlations across successive scans.

According to one embodiment, the set of subject data comprise values of a set of predefined subject parameters, wherein a subject of the parameter of the set of subject parameters indicates an age, disease, gender, handedness or body size of the subject. In this case, the DNN may, for example, advantageously be a fully connected neural network in which the information flows in the forward direction, because the set of subject data may have no time dependence at least during the acquisition of fMRI data. According to one embodiment, the trained DNN is a convolutional neural network, CNN.

According to one embodiment, the trained DNN is configured for outputting the predicted task in association with setting parameters of the task. For example, a task of a given type may have different setting parameters. The DNN may have an output layer that represents different task types and different setting parameters of each task type. This embodiment may further increase the accuracy and efficiency of the predicted task and thus increase the accuracy and efficiency of the acquired fMRI data. The efficiency may be increased in that repeated unnecessary scans (e.g. trying different tasks) may be avoided by using an accurately defined task in accordance with the present subject matter.

In another example, the predicted task is presented to the subject in accordance with setting parameters, wherein execution of the machine executable instructions causes the processor to: control the MRI system for acquiring training fMRI data at a resting state of the subject; predict values of the setting parameters by inputting the training fMRI data to another trained DNN and in response receiving from the another trained DNN the values of the setting parameters.

In another example, the another trained DNN may be configured to receive the same input data (the set of subject data) as the trained DNN and to provide the values of the setting parameters of the predicted task. Thus, the predicted task by the trained DNN may be presented to the subject in accordance with setting parameters that are predicted by the another trained DNN.

For example, multiple other trained DNNs may be provided, wherein each other trained DNN corresponds to a respective task type e.g. one trained DNN for a visual task and another for an audio task etc. That is, each of the other trained DNNs is trained to predict setting parameters of a given type of tasks. For that, each of the other trained DNNs may be trained using a training set that comprises pairs of set of subject data and associated set of task parameter values of that type of tasks e.g. an entry of the training set indicates which settings of the visual task are most suitable for a given subject having a set of subject data. The output layer of the other trained DNN may comprise a node for each setting parameter of the task associated with the other trained DNN.

According to one embodiment, the predicted task has setting parameters, wherein execution of the machine executable instructions causes the processor to determine values of the setting parameters as predefined values associated with a task type of the predicted task. For example, if the predicted task is a visual stimulus, the value of the luminance may be associated with this type of task. According to one embodiment, the setting parameter indicates at least one of visual gratings and luminance and auditory stimuli and volume.

According to one embodiment, the fMRI images comprise 2D or 3D fMRI images. The 2D fMRI images may enable to speed up the whole process of fMRI acquisition in accordance with the present subject matter. The 3D fMRI images may increase the task definition accuracy and thus may increase the accuracy of the acquired fMRI data in accordance with the present subject matter.

According to one embodiment, execution of the machine executable instructions causes the processor to: receive a training set indicative of sets of subject parameters in association with respective task; training a DNN using the training set, thereby generating the trained DNN. In one example, the training set may be updated using the processed set of subject parameters and associated results of processing i.e. the predicted task; and using the updated training set for generating an updated trained DNN for processing further subject data. This may enable a self-improving system and may further increase the accuracy of the determination of tasks in accordance with the present method. The updated trained DNN may further be used for further received sets of subject parameters in order to predict tasks in accordance with the present subject matter.

In another aspect, the invention relates to a medical imaging method, comprising: receiving a set of subject data descriptive of a subject; in response to inputting the set of subject data into a trained deep neural network, DNN, receiving from the trained DNN a predicted task;

presenting the task to the subject; controlling an MRI system for acquiring fMRI data from the subject in response to the predicted task being performed by the subject during the acquisition.

In another aspect, the invention relates to a computer program product comprising machine executable instructions for execution by a processor, wherein execution of the machine executable instructions causes the processor to perform at least part of the method of the preceding embodiment.

It is understood that one or more of the aforementioned embodiments of the invention may be combined as long as the combined embodiments are not mutually exclusive.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

In the following, like numbered elements in the figures are either similar elements or perform an equivalent function. Elements which have been discussed previously will not necessarily be discussed in later figures if the function is equivalent.

Various structures, systems and devices are schematically depicted in the figures for purposes of explanation only and so as to not obscure the present invention with details that are well known to those skilled in the art. Nevertheless, the attached figures are included to describe and explain illustrative examples of the disclosed subject matter.

Figure 1:
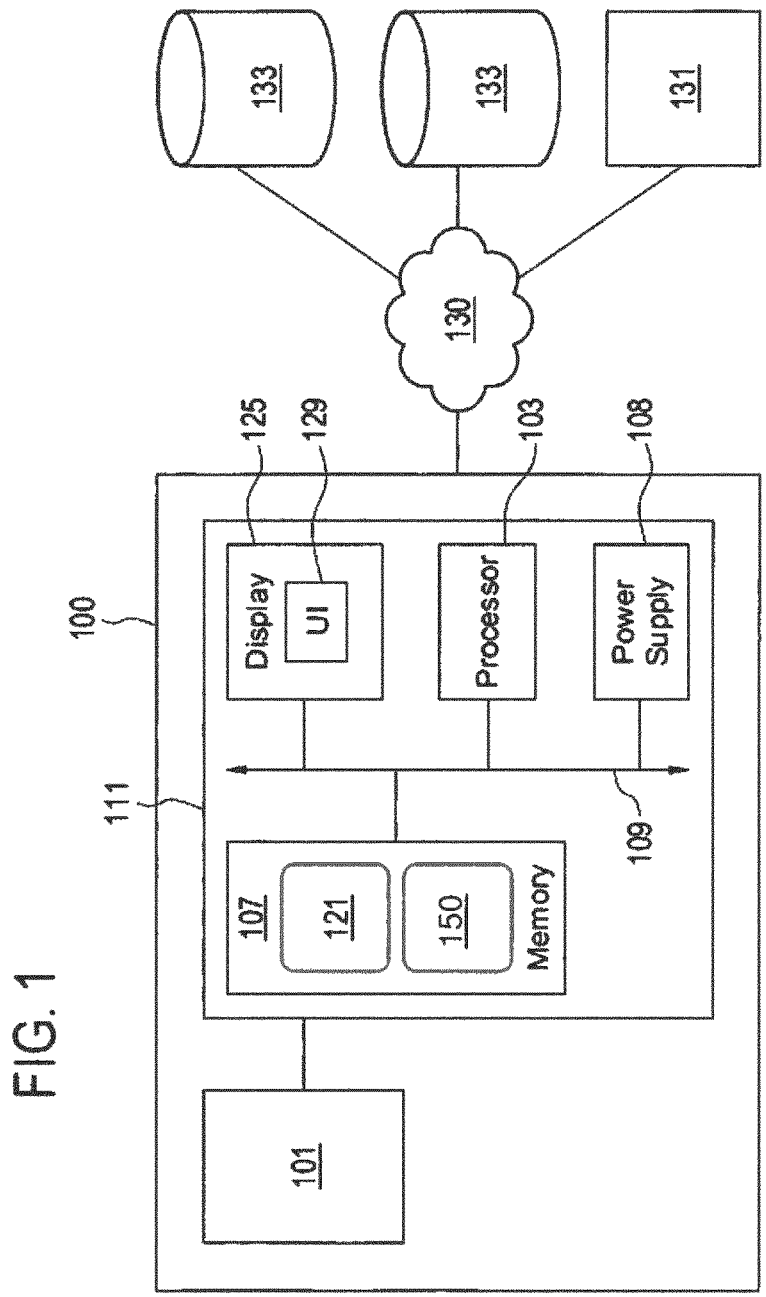
FIG. 1 is a schematic diagram of a control system in accordance with the present subject matter.

FIG. 1 is a schematic diagram of a medical analysis system (or medical imaging system) 100. The medical analysis system 100 comprises a control system 111 that is configured to connect to a scanning imaging system (or acquisition component) 101. The control system 111 comprises a processor 103, a memory 107 each capable of communicating with one or more components of the medical analysis system 100. For example, components of the control system 111 are coupled to a bidirectional system bus 109.

It will be appreciated that the methods described herein are at least partly non-interactive, and automated by way of computerized systems. For example, these methods can further be implemented in software 121, (including firmware), hardware, or a combination thereof. In exemplary embodiments, the methods described herein are implemented in software, as an executable program, and is executed by a special or general-purpose digital computer, such as a personal computer, workstation, minicomputer, or mainframe computer.

The processor 103 is a hardware device for executing software, particularly that is stored in memory 107. The processor 103 can be any custom made or commercially available processor, a central processing unit (CPU), an auxiliary processor among several processors associated with the control system 111, a semiconductor based microprocessor (in the form of a microchip or chip set), a micro-processor, or generally any device for executing software instructions. The processor 103 may control the operation of the scanning imaging system 101.

The memory 107 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 107 can have a distributed architecture, where various components are situated remote from one another, but can be accessed by the processor 103. Memory 107 may store an instruction or data related to at least one other constituent element of the medical analysis system 100.

The control system 111 may further comprise a display device 125 which displays characters and images and the like e.g. on a user interface 129. The display device 125 may be a touch screen display device.

The medical analysis system 100 may further comprise a power supply 108 for powering the medical analysis system 100. The power supply 108 may for example be a battery or an external source of power, such as electricity supplied by a standard AC outlet.

The scanning imaging system 101 may comprise at least one of MRI, CT and PET-CT imagers. The control system 111 and the scanning imaging system 101 may or may not be an integral part. In other terms, the control system 111 may or may not be external to the scanning imaging system 101.

Figure 6:
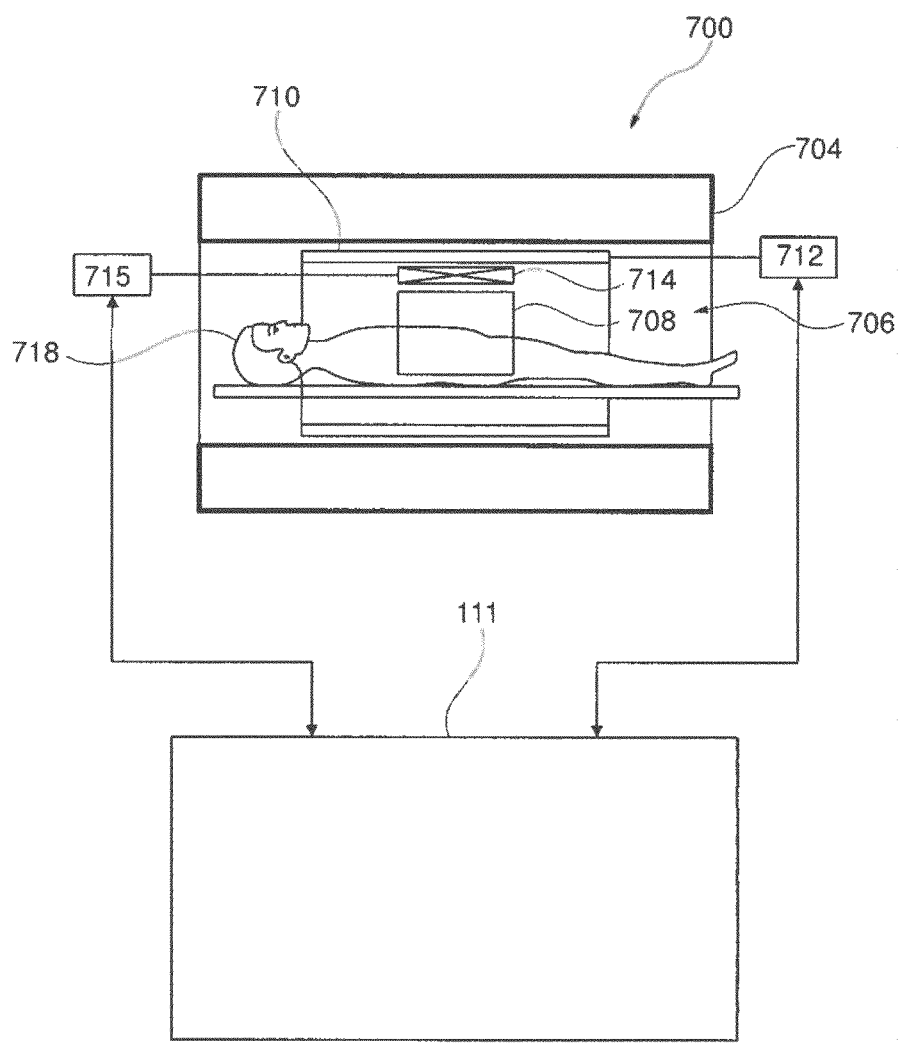
FIG. 6 shows a cross-sectional and functional view of an MRI system.

The scanning imaging system 101 comprises components that may be controlled by the processor 103 in order to configure the scanning imaging system 101 to provide image data to the control system 111. The configuration of the scanning imaging system 101 may enable the operation of the scanning imaging system 101. The operation of the scanning imaging system 101 may for example be automatic. FIG. 6 shows an example of components of the scanning imaging system 101 being an MRI system.

The connection between the control system 111 and the scanning imaging system 101 may for example comprise a BUS Ethernet connection, WAN connection, or Internet connection.

In one example, the scanning imaging system 101 may be configured to provide output data such as images in response to a specified measurement. The control system 111 may be configured to receive data such as MR image data from the scanning imaging system 101. For example, the processor 103 may be adapted to receive information (automatically or upon request) from the scanning imaging system 101 in a compatible digital form so that such information may be displayed on the display device 125. Such information may include operating parameters, alert notifications, and other information related to the use, operation and function of the scanning imaging system 101.

The medical analysis system 100 may be configured to communicate via a network 130 with other scanning imaging systems 131 and/or databases 133. The network 130 comprises for example a wireless local area network (WLAN) connection, WAN (Wide Area Network) connection LAN (Local Area Network) connection or a combination thereof. The databases 133 may comprise information relates to patients, scanning imaging systems, anatomies, scan geometries, scan parameters, scans etc. The databases 133 may for example comprise an electronic medical record (EMR) database comprising patients' EMR, Radiology Information System database, medical image database, PACS, Hospital Information System database and/or other databases comparing data that can be used for planning a scan geometry. The databases 133 may for example comprise a subject data base with appropriate meta data such as age, disease, gender, handedness, body size, etc., and associated task (e.g. visual gratings, auditory stimuli) and/or task parameters (e.g. luminance, volume).

The memory 107 may further comprise an artificial intelligence (AI) component 150. The AI component 150 may or may not be part of software component 121. The AI component 150 may be configured for training a DNN in accordance with the present subject matter and to provide the trained DNN for further use. For example, if the control system 111 is not part of the scanning imaging system 101, the trained DNN may be provided to the scanning imaging system 101 such that it can be used at the scanning imaging system 101 for determining tasks for fMRI data acquisition by the scanning imaging system 101.

Figure 2:
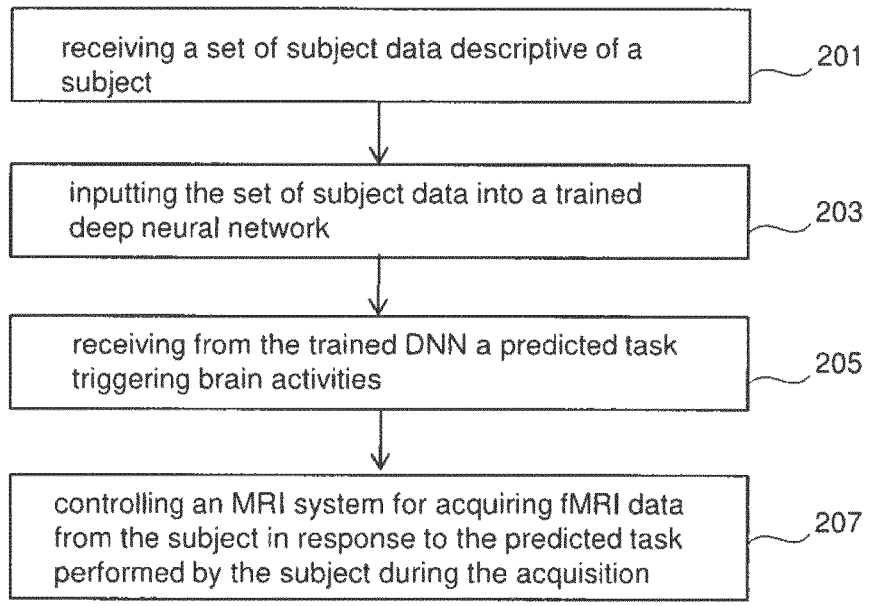
FIG. 2 is a flowchart of a medical imaging method in accordance with an example of the present subject matter.

FIG. 2 is a flowchart of a medical imaging method in accordance with an example of the present subject matter. The method may be a task-based functional magnetic resonance imaging (fMRI) method that enables the study of functional brain networks under task performance by a subject. For exemplification purpose, the DNN of the present method may be a fully connected neural network.

In step 201, a set of predefined subject data descriptive of the subject may be received e.g. by the control system 111. The set of subject data may for example have values of subject parameters indicating at least one of: age, disease, gender, handedness, body size of the subject. The subject data may for example be defined offline. For example, a subject database e.g. 133 may be provided. The subject database comprises metadata such as age, disease, gender, handedness, body size of subjects. The step of receiving the set of subject data may comprise reading the subject database for accessing the set of predefined subject data descriptive of the subject. This may be advantageous as it may save processing resources that would otherwise be required by an online (on the fly) determination of the values of the set of parameters e.g. the time required to read data from the database may be smaller than the time required to collect each of the values of the set of parameters e.g. from one or more sources.

The set of subject data may be input in step 203 into a trained DNN. The DNN may be trained as described with reference to FIG. 4. For example, the input layer of the trained DNN may comprise a node for each subject parameter e.g. a node for age parameter and a node for gender parameter etc. The values of the subject parameters may be input to respective nodes of the input layer. And an inference of the trained DNN using the input values may result in a predicted task.

For that, the trained DNN may for example be downloaded from a remote computer system e.g. 111, where it is stored. The downloading may be performed into a system e.g. 101 where the present method of FIG. 2 is executed. This may enable to locally execute the present method e.g. there is no need to send data over a network in order to use the trained DNN. In another example, the set of subject data may be sent e.g. over a communication network (such as internet) between the system where the present method is executed to the remote computer system storing the trained DNN, and in response to sending the set of subject parameters, the set of subject parameters may be input to the trained DNN at the remote computer system. This may enable a remote and centralized usage of the trained DNN e.g. multiple users may make use of the trained DNN. This may enable a consistent task definition and thus consistent fMRI data acquisition among different users.

In response to inputting the set of subject data to the trained DNN, a predicted task may be received in step 205 from the trained DNN. The trained DNN may for example have an output layer having a node associated with each type of tasks. Each of the nodes of the output layer may be associated with a value indicating the probability of the task associated with the node as being the task suitable for the present subject. For example, the task associated with the highest value may be the predicted task received in step 205.

In one example, the predicted task may be associated with setting parameters (which are also predicted as part of predicting the task) such as volume of an audio stimuli or luminance of a visual stimuli etc. In another example, the setting parameters may be predicted using another trained DNN. The another trained DNN may be configured to receive the same input data (of step 203) as the trained DNN and to predict the setting parameters of the predicted task. This may enable to use multiple subsequent networks, one network that outputs the task itself and a subsequent network that is task specific and outputs the parameters for the specific task. The input data to both networks may be the same. This may particularly be advantageous as different tasks may have different parameters or different number of parameters and thus using the subsequent network may be beneficial.

An MRI system may be controlled for acquiring fMRI data in step 207 from the subject in response to the predicted task being performed by the subject during the acquisition. For example, the subject may be presented the predicted task for enabling the acquisition of the fMRI data. The predicted task may be presented to the subject in accordance with the setting parameters of the predicted task. In one example, the subject may learn before data acquisition the predicted task he or she is going to perform for the fMRI data acquisition.

Figure 3:
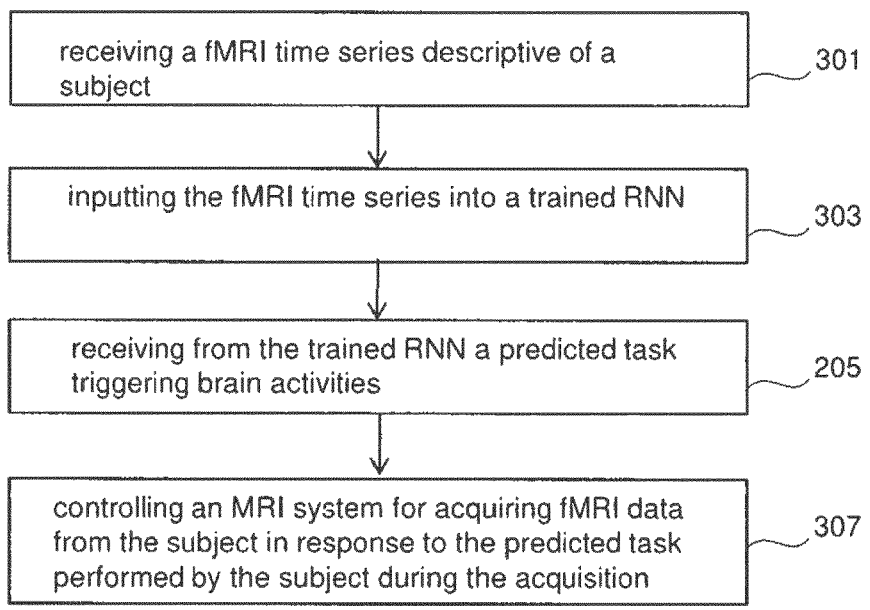
FIG. 3 is a flowchart of a medical imaging method in accordance with an example of the present subject matter.

FIG. 3 is a flowchart of a medical imaging method in accordance with an example of the present subject matter. The method may enable to perform a task-based functional magnetic resonance imaging (tfMRI) that enables the study of functional brain networks under task performance by a subject. In this example of FIG. 3, the DNN may be a recurrent neural network. Using the RNN may be advantageous as it may enable to capture BOLD signal correlations across successive scans.

In step 301, a set of predefined subject data descriptive of the subject may be received e.g. by the control system 111. The set of subject data may for example comprise fMRI time series data that is acquired in a resting state of the subject. For example, the set of subject data may be a set of 2D fMRI images (e.g. each time point of the time series represents one scan and one image).

The subject data may for example be defined offline. For example, the other scanning imaging system 131 may be used to acquire the fMRI time series when the subject is at a resting state and may be configured to send the acquired fMRI time series to the control system 111. In another example, the subject data may be determined or generated at a previous point of time before performing the present method. This may be advantageous as it may save processing resources that would otherwise be required by an online (on the fly) determination of the values of the set of parameters.

The set of fMRI images that are received in step 301, may be input to a trained RNN. Each image of the set of images may be an image at a point of time of a fMRI time series. The RNN is trained to receive as input fMRI time series and to provide or predict a corresponding task. The RNN may for example be trained using a training set comprising multiple sets of fMRI images, wherein each set of images is labeled by a label indicating the task (e.g. and setting parameters of the task) that is suitable for the subject from which the set of fMRI images have been acquired. In one example, the RNN may be a Long short-term memory (LSTM) network.

In another example, the set of input images may be 3D images. This may provide 4D data, i.e. 3D images and time dimension. In this case, a combination of a CNN and a RNN such as temporal convolutional nets (TCNs) may be used and the set of fMRI images that are received in step 301, may be input to a trained TCN. The TCN is trained to receive as input fMRI time series and to provide or predict a corresponding task. The particular architecture of the network(s) (TCN or RNN) such as the number and type of layers may depend on the input data to the network.

The trained RNN (or trained TCN) may for example be downloaded from a remote computer system e.g. 111, where it is stored. The downloading may be performed into a system e.g. 101 where the present method of FIG. 3 is executed. This may enable to locally execute the present method e.g. there is no need to send data over a network in order to use the trained RNN. In another example, the set of subject data may be sent e.g. over a communication network (such as internet) between the system where the present method is executed to the remote computer system storing the trained RNN, and in response to sending the set of subject data, the set of subject data may be input to the trained RNN at the remote computer system. This may enable a remote and centralized usage of the trained RNN e.g. multiple users may make use of the trained RNN. This may enable a consistent task definition and thus consistent fMRI data acquisition among different users.

In response to inputting the set of fMRI images into the trained RNN, the trained RNN may output in step 305 a predicted task. For example, values of the setting parameters of the predicted task may further be provided by the trained RNN.

An MRI system e.g. 101 may be controlled for acquiring fMRI data in step 307 from the subject in response to the predicted task being performed by the subject during the acquisition.

Figure 4:
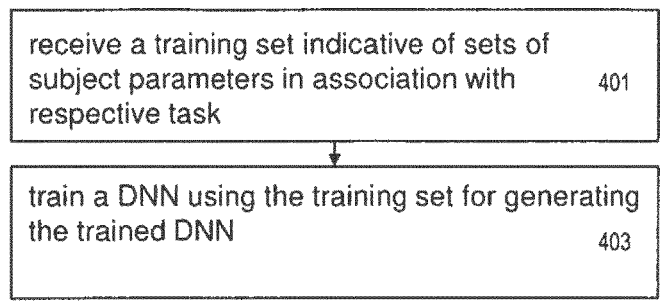
FIG. 4 is a flowchart of a method for training a DNN in accordance with the present disclosure.

FIG. 4 is a flowchart of a method for training a DNN in accordance with the present disclosure. The DNN may be a fully connected neural network.

In step 401, a training set may be received e.g. by the control system 111. The training set is indicative of sets of subject data (or subject metadata) in association with respective tasks e.g. each subject data is labeled with a respective task. For example, the training set may be obtained from one or more sources. For example, the training set may be retrieved by the control system 111 from the databases 133.

The training set may comprise entries, wherein each entry comprises respective values of the set of metadata in association with the task. For example, a set of subject parameters such as par1, par2 and par3 may be provided. The training set may comprise pairs {(par1_value, par2_value, par3_value); task} of values of the three subject parameters and associated task definition e.g. the task may be provided as a label of the respective values of the set of subject parameters. The task may for example be a visual or auditory (sound) task.

The number of the set of parameters may determine the number of nodes in the input layer of the DNN. For example, each parameter of the set of parameters may be associated with a respective node of the DNN.

In step 403, the DNN may be trained using the received training set. The DNN may, for example, comprise groups of weights e.g. weights from the input layer to a first hidden layer, from first to second hidden layer etc. Before the training of the DNN, the weights may be initialized by random numbers or values. The training may be performed in order to search optimization parameters (e.g. weights and bias) of the DNN and minimize the classification error or residuals. For example, the training set is used as input for feeding forward the DNN. This may enable to compute data loss in the output layer of the DNN e.g. by a loss function (cost function). The data loss measures the compatibility between a predicted task and the ground truth label. After getting data loss, the data loss may be minimized by changing the weights and bias of the DNN. This may for example be performed by back-propagating the loss into every layers and neuron by gradient descent.

In one example, the training set of step 401 may continuously be enhanced using additional data. For example, the training set may be updated by adding the processed set of subject parameters and associated results of processing as described with reference to FIG. 2. Additionally or alternatively, the training set may be updated by adding further pairs of subject parameters and corresponding tasks. Step 403 may regularly be repeated e.g. as soon as the training set has been updated. And the retrained DNN may, for example, be used instead of the trained DNN in the method of FIG. 2.

Figure 5:
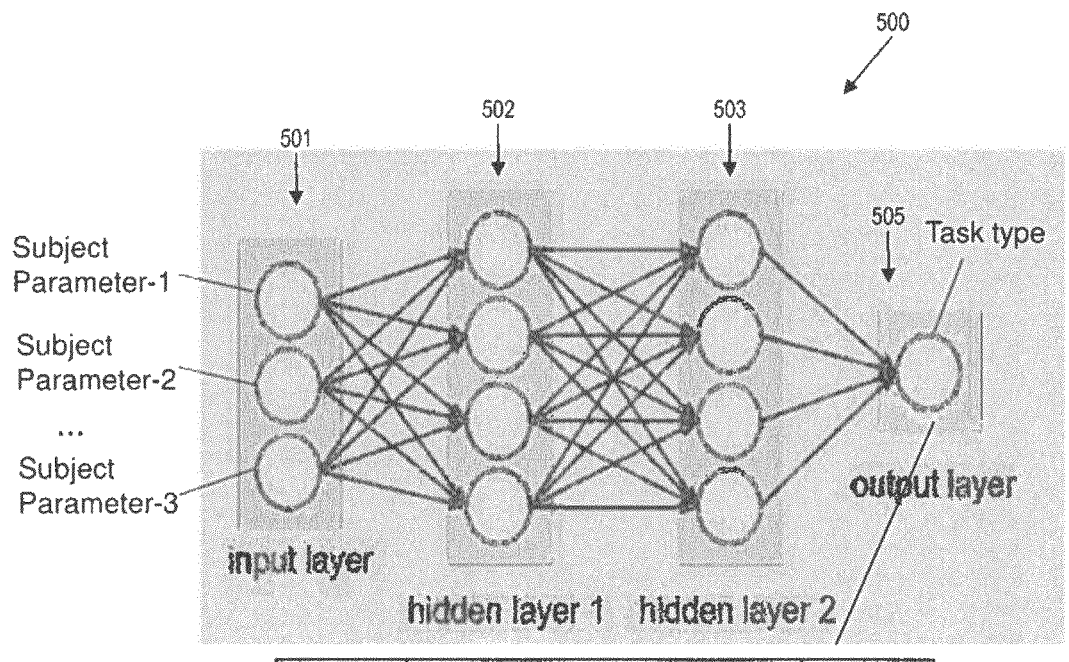
FIG. 5 is a block diagram illustrating a DNN in accordance with an example of the present subject matter.

FIG. 5 is a block diagram illustrating a DNN 500 in accordance with an example of the present subject matter. The DNN 500 may be a fully connected neural network. The DNN 500 may for example comprise an input layer 501 and an output layer 505. The DNN 500 further comprises hidden layers 502 and 503. The number of nodes in each of the hidden layers 502 and 503 may for example be user defined. The number of layers and nodes is provided for exemplification purpose only, but the number of layers may vary e.g. from 2 to 500. And a layer of the DNN 500 may comprise different operations such as batch normalization, RELU, dropout, convolution, and so on.

The input layer 501 may comprise for each parameter of the set of subject parameters a respective node e.g. if the set of subject parameters comprises 10 parameters, the input layer may comprise 10 respective nodes. The output layer may for example comprise a node for each type of tasks. The output of the DNN 500 may be scores associated with each node of the output layer 505.

FIG. 6 illustrates a magnetic resonance imaging system 700 as an example of the medical system 100. The magnetic resonance imaging system 700 comprises a magnet 704. The magnet 704 is a superconducting cylindrical type magnet with a bore 706 in it. The use of different types of magnets is also possible; for instance, it is also possible to use both a split cylindrical magnet and a so called open magnet or a sealed magnet. A split cylindrical magnet is similar to a standard cylindrical magnet, except that the cryostat has been split into two sections to allow access to the iso-plane of the magnet. Such magnets may for instance be used in conjunction with charged particle beam therapy. An open magnet has two magnet sections, one above the other with a space in-between that is large enough to receive a subject 718 to be imaged, the arrangement of the two sections area similar to that of a Helmholtz coil. Inside the cryostat of the cylindrical magnet there is a collection of superconducting coils. Within the bore 706 of the cylindrical magnet 704 there is an imaging zone or volume or anatomy 708 where the magnetic field is strong and uniform enough to perform magnetic resonance imaging.

Within the bore 706 of the magnet there is also a set of magnetic field gradient coils 710 which is used during acquisition of magnetic resonance data to spatially encode magnetic spins of a target volume within the imaging volume or examination volume 708 of the magnet 704. The magnetic field gradient coils 710 are connected to a magnetic field gradient coil power supply 712. The magnetic field gradient coils 710 are intended to be representative. Typically, magnetic field gradient coils 710 contain three separate sets of coils for the encoding in three orthogonal spatial directions. A magnetic field gradient power supply supplies current to the magnetic field gradient coils. The current supplied to the magnetic field gradient coils 710 is controlled as a function of time and may be ramped or pulsed.

MRI system 700 further comprises an RF coil 714 at the subject 718 and adjacent to the examination volume 708 for generating RF excitation pulses. The RF coil 714 may include for example a set of surface coils or other specialized RF coils. The RF coil 714 may be used alternately for transmission of RF pulses as well as for reception of magnetic resonance signals e.g., the RF coil 714 may be implemented as a transmit array coil comprising a plurality of RF transmit coils. The RF coil 714 is connected to one or more RF amplifiers 715.

The magnetic field gradient coil power supply 712 and the RF amplifier 715 are connected to a hardware interface of the control system 111. The memory 107 of control system 111 may for example comprise a control module. The control module contains computer-executable code which enables the processor 103 to control the operation and function of the magnetic resonance imaging system 700. It also enables the basic operations of the magnetic resonance imaging system 700 such as the acquisition of magnetic resonance data.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', 'module' or 'system'. Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the interne, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

A 'computer memory' or 'memory' is an example of a computer-readable storage medium. A computer memory is any memory which is directly accessible to a processor. A 'computer storage' or 'storage' is a further example of a computer-readable storage medium. A computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising 'a processor' should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the 'C' programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device'. A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word 'comprising' does not exclude other elements or steps, and the indefinite article 'a' or 'an' does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical system
101 scanning imaging system
103 processor
107 memory
108 power supply
109 bus
111 control system
121 software
125 display
129 user interface
133 databases
201-405 method steps
500 DNN
501 input layer
502 hidden layer
503 hidden layer
505 output layer
700 magnetic resonance imaging system
704 magnet
706 bore of magnet
708 imaging zone
710 magnetic field gradient coils
712 magnetic field gradient coil power supply
714 radio-frequency coil
715 RF amplifier
718 subject

The invention claimed is:
1. A medical imaging system comprising:
a magnetic resonance imaging (MRI) system configured to acquire functional magnetic resonance imaging (fMRI) data from a subject within an imaging zone;

a memory configured to store machine executable instructions;

a processor configured to control the medical imaging system, wherein execution of the machine executable instructions causes the processor to:

receive a set of predefined subject data descriptive of the subject comprising values of a set of predefined subject parameters, wherein a subject parameter of the set of subject parameters indicates at least one of an age, disease, gender, handedness or body size of the subject;

in response to inputting the set of subject data into a trained deep neural network (DNN), receive from the trained DNN a predicted task;

present the task to the subject; and control the MRI system for acquiring fMRI data from the subject in response to the predicted task being performed by the subject during the acquisition.

2. The system of claim 1, wherein the trained DNN is a recurrent neural network (RNN) and the set of subject data comprises a set fMRI images of the subject in a resting state, and wherein the inputting of the set of subject data comprises inputting the set of fMRI images to the trained DNN.

3. The system of claim 1, wherein the trained DNN is a convolutional neural network (CNN).

4. The system of claim 1, wherein the trained DNN is configured to output the predicted task in association with setting parameters of the task.

5. The system of claim 1, wherein the predicted task is presented to the subject in accordance with setting parameters, wherein execution of the machine executable instructions further causes the processor to determine values of the setting parameters as predefined values associated with a task type of the predicted task.

6. The system of claim 1, wherein the predicted task is presented to the subject in accordance with setting parameters, wherein execution of the machine executable instructions further causes the processor to input the set of subject data to another trained DNN and to receive from the another trained DNN setting parameters of the predicted task.

7. The system of claim 2, wherein the fMRI images comprising 2D or 3D fMRI images.

8. The system of claim 1, wherein execution of the machine executable instructions causes the processor to: receive a training set indicative of sets of subject data in association with respective tasks; and train a DNN using the training set, thereby generating the trained DNN.

9. The system of claim 4, wherein the setting parameter indicates at least one of a: luminance of visual stimuli, volume of an auditory stimuli, and duration of the stimuli.

10. A medical imaging method, comprising:

receiving a set of subject data descriptive of a subject;

in response to inputting the set of subject data into a trained deep neural network (DNN) receiving from the trained DNN a predicted task;

presenting the predicted task to the subject; and controlling an MRI system for acquiring fMRI data from the subject in response to the predicted task being performed by the subject during the acquisition.

11. A computer program product comprising machine executable instructions stored on a non-transitory computer readable medium for execution by a processor, wherein execution of the machine executable instructions causes the processor to:

receive a set of subject data descriptive of a subject;

in response to inputting the set of subject data into a trained deep neural network (DNN), receive from the trained DNN a predicted task;

present the task to the subject; and control an MRI system for acquiring fMRI data from the subject in response to the predicted task being performed by the subject during the acquisition.

12. The computer program product of claim 11, wherein the trained DNN is a recurrent neural network (RNN) and the set of subject data comprises a set fMRI images of the subject in a resting state, and wherein the inputting of the set of subject data comprises inputting the set of fMRI images to the trained DNN.

13. The computer program product of claim 11, wherein the trained DNN is a convolutional neural network (CNN).

14. The computer program product of 12, wherein the trained DNN is configured to output the predicted task in association with setting parameters of the task.

15. The computer program product of 15, wherein the instructions further cause the processor to: present the predicted task to the subject in accordance with setting parameters; and determine values of the setting parameters as predefined values associated with a task type of the predicted task.

16. The computer program product of claim 11, wherein the instructions further cause the processor to: present the predicted task to the subject in accordance with setting parameters; and input the set of subject data to another trained DNN and to receive from the another trained DNN setting parameters of the predicted task.

17. The computer program product of claim 11, wherein execution of the machine executable instructions causes the processor to: receive a training set indicative of sets of subject data in association with respective tasks; and train a DNN using the training set, thereby generating the trained DNN.

18. The computer program product of claim 12, wherein the fMRI images comprising 2D or 3D fMRI images.

19. The computer program product of claim 14, wherein the setting parameter indicates at least one of a: luminance of visual stimuli, volume of an auditory stimuli, and duration of the stimuli.

* * * * *